Patented July 30, 1946

2,404,910

UNITED STATES PATENT OFFICE 2,404,910

PLASTIC COMPOSITION AND METHOD OF MAKING

Auguste V. Keller, Long Island City, N. Y., assignor, by mesne assignments, to Howard Thompson, Minneapolis, Minn.

No Drawing. Application November 26, 1941, Serial No. 420,592

2 Claims. (Cl. 260—9)

This invention relates to improvements in composite or laminated materials from condensation of urea or thio-urea or their derivatives, an aldehyde and a carbohydrate.

It has been customary in the manufacture of laminated materials first to obtain the condensation product in a fusible or a soluble form, then to impregnate cellulose sheet or fibre materials with the condensation product after which the impregnated material is subjected to heat and pressure to form the composite product. Under such processes penetration of the condensation material into the fibre does not or only partially occurs and upon drying off a film of resin usually adheres to the fibres, failing chemically to combine with the cellulose.

Even and deep penetration is difficult to attain due mainly in urea solutions to the gradually increasing size of the resin particles or colloidal aggregates in either alkaline or acidic solutions. It has been usual practice when working with urea resins to use acid accelerating or catalyzing agents and to mold the impregnated material with a high moisture content, the moisture acting as a fluxing medium, with consequent long curing time and likelihood of blemishes in the final product. With phenolic resin impregnating solutions, the viscosity of the solution, unless diluted with a solvent to an extremely low resin content, prevents the permeation of the resin into the fibres, so that the mass of cellulose fibres is coated only and, when molded under heat and pressure, is not chemically combined with the resin as is the case with properly impregnated urea type materials. A similar effect is observed when impregnating cellulosic fibre with natural resins or gums dissolved in a solvent or as resinates in aqueous emulsions.

Other attempts to solve impregnating problems have been to parchmentize or hydrolyze the cellulose in solutions of parchmentizing agents such as zinc chloride, to impregnate the cellulose with formaldehyde and subsequently pass the sheets through a bath containing urea or vice versa, and, in the case of phenolic laminates, to pretreat the cellulose in a bath containing alcohol and then pass the sheets through a solution of the resin. It has also been the practice in the industry to add accelerating agents during or after condensation has begun or prior to impregnation, the accelerating agents causing polymerization of the insoluble end product. This results, even with latent accelerators or the inclusion of buffer agents, in the formation in the solution of colloidal aggregates which cause a thickening of the liquid and a decreasing power of penetrability. Even when reduced amounts of accelerating agents are used a tendency towards uneven impregnation is apparent and a longer curing period is necessary. When the accelerator content is high, blistering or other blemishes occur and the flow of the material is materially reduced. It is well recognized that pretreatment of cellulose in the manners above described results in the formation in the sheet of impenetrable colloidal substances filling the cells and offering resistance to the entry of the subsequent viscous impregnating colloidal solution as two like colloid solutions do not permeate each other.

The general object of the present invention is materially to improve impregnated cellulose condensation products and to avoid the above described and other difficulties and inefficiencies attendant upon prior practices.

The invention in general comprehends the introduction into the cellulosic fibres, before impregnation with the urea or other condensation materials, of a metal salt capable of combining with the cellulose and possessing an affinity for the condensation materials. It also comprehends the use of a saccharide in admixture with the materials and such a saccharide may if desired be introduced into the cellulosic material prior to impregnation as in the form of a solution with the metal salt. It is often desirable and the invention also contemplates the inclusion of a wetting agent with the impregnating materials whereby more quickly and efficiently to effect penetration of the thick sheets or masses of cellulosic material.

More particularly, according to the invention, fibres containing a carbohydrate such as cellulose in compacted or sheet form are impregnated or otherwise pretreated with a solution of a metal salt and a saccharide in ammoniated solution, sufficient to cause a heteropolar reversible colloid deposition of a hydrophilic nature. Such treatment is preparatory to impregnation with a condensation product such as urea and a neutral solution of formaldehyde in which is dissolved a wetting agent capable of causing a change from the weak colloidal state of the initial condensation product to a fluid of more simple molecular association, enabling a more even and increased penetrability of the condensation solution into the fibres.

There is thus effected a thorough combining of the cellulose with part of the reacting ingredients whereby the cellulose becomes a part of the final reacting system. The fibrous sheets or other masses of material compounded according to the invention have a good resistance to moisture after molding and are therefore applicable as insulating mediums even under highly humid conditions. The material is non-inflammable, resistant to mild acids and alkalies, and is form stable at continuous temperatures from below zero to 170° F. The product of the invention is comparable in all respects with known urea-type laminates in its electrical and mechanical properties, extreme toughness, ease in machining and capacity to flow when molded under heat and pressure.

In one specific embodiment of the invention, sheets of cellulose fibre or cellulose fibre compacted in loose form are sprayed or otherwise treated with an aqueous solution containing 15% by weight of a saccharide such as sucrose
10% by volume of concentrated ammonia, specific gravity 0.882
0.2% by weight of copper sulphate.

The fibre is sprayed with the above solution until the weight has increased 50%, that is, until 100 pounds of the unimpregnated fibre weighs 150 pounds. The thus pretreated fibre is then passed through a vessel containing a freshly prepared and cold solution containing 1 mol of urea
1.2 to 1.5 mols of formaldehyde
36% by weight of HCHO
1% of the condensation product of lysalbinic and protalbinic acids with a fatty chloro-acid preferably prepared by dissolving the urea in the formaldehyde solution, neutralizing the solution and then dissolving the wetting agent therein.

The now saturated sheets or masses are passed through a low temperature humidity controlled drying oven until more than 50% of the moisture content has evaporated. At this point the material passes into the hot zone of the oven wherein the temperature of the air may be increased to 75° C. The drying operation is interrupted when the moisture content of the sheet is between 6 and 12%, dependent upon the conditions of storage or the period of time to elapse before molding the sheets either singly or piled up into the desired number of laminations by heat and pressure.

The sheets, preparatory to the molding operation, may be stamped or cut to shape as preforms, or placed or otherwise built up in a mold or multiple of molds to obtain desired shapes other than flat sheets. For example, the dried impregnated material in strip or sheet form may be compressed in a mold or otherwise shaped around a heated mandrel to produce tubular forms. Alternatively, the sheet stock may be molded in shaped molds of large area to produce shaped panels, boxes, or like containers carrying ribs or flanges, the material possessing sufficient flow qualities to fill the configurations of the mold under pressures higher than 500 pounds per square inch and under 2000 pounds per square inch. The temperature of the molding may be varied from 125° C. to 160° C. A very satisfactory material produced according to the invention molds at 145° C. and cures to an excellent product in 80 seconds per 0.08" thickness (40 seconds per millimeter) at 1000 pounds per square inch, over an area of 25 square inches, the edges being bounded by a flange 0.04".

In one specific embodiment of the invention, thermosetting impregnated sheet material, such as above described, may be combined with a thermoplastic material in sheet form and subjected to heat and pressure, in one operation if desired, in a manner whereby the more resilient thermoplastic material forms a base or an interlayer surfaced by or sandwiched between sheets of thermosetting material. The thermoplastic sheets may be composed of cellulosic or mineral fibre upon which is precipitated or which may be impregnated with natural resins, resinates, rosins, bitumens, rubber, asphalts, waxes, oils or synthetic thermoplastic resins or mixtures of these or like substances. The thermo-setting sheets may be produced as described in the above specific example or may be modified or mixed with other types of thermo-setting resins, or may be mixed with delaying or other agents and may be pigmented, colored or designed.

A particular advantage of the method contemplated by this invention resides in the ability to use common, raw, cooked or unbleached fibre, the chief requirements being preferably, low moisture content, freedom from chemicals unsympathetic with the desired results, approximately neutral to cresol red indicator solution, and substantially free from grease or other water repellant materials. Specifically, I may use fibre sheets or masses of, or compounded from a mixture of, asbestos, mica, glass, fibres such as cotton, wood pulp, ramie, or other fibre of cellulosic or mineral origin. I may also use the foregoing or other sheets or masses previously impregnated, loaded or coated with other type resins, rosins or natural resins or gums, resinates, asphalts or like bituminous substances, graphite, sulphur, hydrated compounds of alumina or silica, barytes, whiting, starch or other substances.

An average type of cellulosic filler suitable for the purpose of this invention will preferably absorb 250 parts of water per 100 parts of fibre by weight, or 1125 grams of water per pound of fibre where the solid resin content in admixture with the fibre is 1:1 and the solid resin content of the urea condensation product is approximately 50%. Consequently, 770 ccs. at 1.17 specific gravity or 900 grams of liquid condensation product will be required per 450 grams of fibre.

The exact chemical effects or the correct theory of action of metal salts in the condensation product of this invention are difficult to determine but my extensive experiments have shown that the practical results thereof are extremely satisfactory even when very minute quantities are used. It is possible, aside from the slight solvent action that may take place on the cellulose, that a secondary action occurs resulting in the formation of nuclei evenly distributed and causing the urea formaldehyde solution to commence condensation to the gel phase in more intimate contact with the fibre cell than would otherwise result. It is also possible that an electrolytic or perhaps an electrostatic effect may be responsible. Copper sulphate has proved eminently satisfactory partially at least for the reason that a catalytic effect is believed obtained from the acidic nature of this salt. It must be understood, however, that I do not limit my invention to the use of this particular compound since a great variety of other metal salts, colloidal metals or metalloids are suitably operable in the invention. They are difficultly classifiable but, in general, must be capable of combining with the cellulose and not be incompatible with the condensation product, preferably having an affinity for the latter. I have successfully employed, besides copper sulphate, the following: the sulphates of nickel, aluminum and zinc; the soluble form of chromic sulphate; the tri and tetra chlorides of titanium; zinc chloride; zinc dichromate; copper (cupric) formate; chromium and ferric oxalates.

The saccharide or polyose addition and the manner in which it is incorporated is also an important feature of the invention. I have found that aldoses and ketoses, by virtue of their aldehydic or ketonic functions, react under certain mild conditions with urea to an at present undefined extent. These substances also react with formaldehyde by reason of their alcoholic functions with the tendency to form a more complex molecular arrangement in a urea-formaldehyde mixture. Control of plasticity among other advantages is obtained by incorporating a saccharide in the cellulose in a pretreatment stage or prior to impregnation with the condensation product. Resin impregnated sheets made according to the methods herein described but without the addition of a saccharide possess reduced flow qualities and require considerable pressure whereas with such addition an easier flowing mixture is obtained. The saccharide addition also tends to prevent over-hydration of the cellulose and is very compatible with urea and formaldehyde. Sugar from the beet (*Beta vulgaris*), the maple (*Acer saccarinum*) and the sugar cane (*Saccarinum officinarum*) in crystalline form as obtained from the second to the fifth boilings have been successfully used in my experiments. However, since other saccharides are perhaps equally as operable I do not limit the invention to the saccharides specified or to the crystalline forms.

In my preferred method, both the metal salt and saccharide are employed in an aqueous solution of ammonia to pretreat the cellulosic material to effect most efficiently the solvent, softening or partial peptization action to render an otherwise inert cellulose more receptive or reactive to the urea condensation product and also to coloring matter. Thus I have found it expedient to dissolve mold lubricants, dyes or other materials for providing colored or decorative effects in the preliminary ammoniacal solution to obtain an even dispersion of the material throughout the fibre.

The general qualities preferred in the wetting agent are that it be neutral, substantially colorless in aqueous solution, stable in the presence of mild acids and alkalies, and be completely absorbed in the final reaction to avoid bleeding. It is also desirable that the wetting agent contain or develop no free fatty acids or sulphonated bodies or impair the vitality of the fibre and preferably should possess its best wetting properties at approximately 18° C. A secondary value obtained by the use of a wetting agent is the even level drying which results especially when using certain blue dyes.

While I have here throughout referred particularly to the use of urea type condensation products, it will be understood that the cellulose pretreating steps are also valuable in connection with thermo-setting resinous materials of other types and the invention so contemplates.

I claim:

1. A plastic composition comprising cellulose treated with an ammoniated solution of a sugar capable of reacting with urea and formaldehyde and a metal salt capable of combining with the cellulose selected from the group consisting of the sulphates of copper, nickel, aluminum and zinc; the soluble form of chromic sulphate; the tri and tetra chlorides of titanium; zinc chloride; zinc dichromate; copper (cupric) formate; chromium and ferric oxalates, said treated cellulose being impregnated with a urea-formaldehyde condensation product.

2. The method of making a urea-formaldehyde plastic mass which comprises pretreating cellulosic fibrous material with an ammoniated solution containing a metal salt capable of combining with the cellulose selected from the group consisting of the sulphates of copper, nickel, aluminum and zinc; the soluble form of chromic sulphate; the tri and tetra chlorides of titanium; zinc chloride; zinc dichromate; copper (cupric) formate; chromium and ferric oxalates, and a sugar capable of reacting with urea and formaldehyde, and impregnating the pretreated cellulosic fibrous material with a urea-formaldehyde mixture.

AUGUSTE V. KELLER.